(12) United States Patent
Williams et al.

(10) Patent No.: US 6,538,140 B1
(45) Date of Patent: Mar. 25, 2003

(54) COMPLEX OXONOL INFRARED RADIATION SENSITIVE COMPOUNDS

(75) Inventors: Kevin W. Williams, Rochester, NY (US); Shiying Zheng, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/946,420

(22) Filed: Sep. 5, 2001

(51) Int. Cl.⁷ .............................................. C07D 41/10
(52) U.S. Cl. ..................... 546/271.4; 548/226
(58) Field of Search .............. 548/226; 546/347, 546/271.4

(56) References Cited

U.S. PATENT DOCUMENTS

| | | | |
|---|---|---|---|
| 5,213,956 A | 5/1993 | Diehl et al. | 430/522 |
| 5,234,806 A | 8/1993 | Kaneko et al. | |
| 5,985,514 A | 11/1999 | Zheng et al. | 430/944 |
| 6,248,886 B1 | 6/2001 | Williams et al. | 544/106 |
| 6,248,893 B1 | 6/2001 | Williams et al. | 546/347 |

FOREIGN PATENT DOCUMENTS

EP    0 363 107 A    4/1990
EP    1 109 059 A    6/2001

OTHER PUBLICATIONS

CA 131:338296, Halik et al. 1999.*

* cited by examiner

*Primary Examiner*—Jane Fan
(74) *Attorney, Agent, or Firm*—J. Lanny Tucker

(57) ABSTRACT

Infrared radiation-sensitive compounds have been found that are represented by Structure DYE as follows:

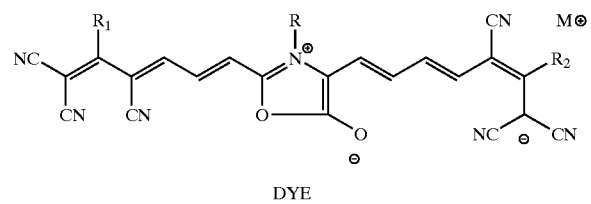

DYE wherein R is a substituted or unsubstituted alkyl group, substituted or unsubstituted cycloalkyl group, substituted or unsubstituted heterocyclic group, or substituted or unsubstituted carbocyclic aromatic group, $R_1$ and $R_1$ are independently substituted or unsubstituted heterocyclic or carbocyclic aromatic groups, and $M^+$ is a monovalent cation. These compounds have a $\lambda_{max}$ above 700 nm and are can be used in a number of photosensitive or heat-sensitive imaging materials.

9 Claims, No Drawings

COMPLEX OXONOL INFRARED RADIATION SENSITIVE COMPOUNDS

FIELD OF THE INVENTION

This invention relates to novel compounds that are infrared radiation sensitive. More particularly, this invention relates to novel oxonol compounds that are sensitive at 700 nm or higher wavelengths in water or water-miscible organic solvents.

BACKGROUND OF THE INVENTION

Particulate compounds that absorb at various wavelengths have been used in photographic silver halide materials for many years. For example, such compounds have been used as "filter" dyes to absorb electromagnetic radiation ("light") from different regions of the electromagnetic spectrum, such as red, blue, green, ultraviolet and infrared regions. These filter dyes are often required to perform the function of absorbing light during exposure of the material so as to prevent or at least inhibit light of a particular region of the spectrum from reaching at least one of the radiation-sensitive layers of the material.

Particulate filter dyes can be designed with various features to facilitate their use and/or immobilization in photographic materials, as described for example in U.S. Pat. No. 5,213,956 (Diehl et al.).

There is a need in the photographic industry for compounds that absorb in the near infrared and infrared regions of the electromagnetic spectrum for various purposes. Such materials can be used, for example, to absorb heat and to initiate or facilitate imaging in lithographic printing plates. However, such compounds (that is, IR dye sensitizers) must be compatible with other components of imaging formulations used in such printing plates.

Organic dye salts, by nature, are often partially soluble in water or alcoholic coating solvents and are thus preferred as IR dye sensitizers in lithographic plate imaging compositions. However, many such salts have been found to be unacceptable because of insufficient solubility, because they react with the charged polymer to form hydrophobic products that can result in scummed or toned images, or because they offer insufficient thermal sensitization in imaging members. In particular, there is a need to have IR dye sensitizers that are compatible with thiosulfate polymers, such as those described in U.S. Pat. No. 5,985,514 (Zheng et al.).

Useful oxonol IR-sensitive compounds with various heterocyclic and carbocyclic moieties are described in U.S. Pat. No. 6,248,886 (Williams et al.) and U.S. Pat. No. 6,248,893 (Williams et al.).

There is a continuing need for IR-sensitive compounds for various imaging applications.

SUMMARY OF THE INVENTION

We have discovered that certain oxonol compounds are useful as infrared radiation absorbing compounds in printing plates and other thermally-sensitive imaging materials. These novel compounds are soluble in water or water-miscible organic solvents, absorb radiation and have a $\lambda_{max}$ greater than 700 nm as measured in water or a water-miscible organic solvent. These compounds are also represented by Structure DYE shown as follows:

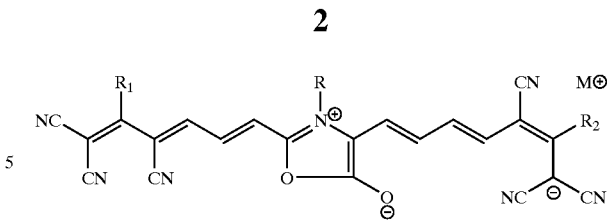

wherein R is a substituted or unsubstituted alkyl group, substituted or unsubstituted cycloalkyl group, or substituted or unsubstituted heterocyclic group, or a substituted or unsubstituted carbocyclic aromatic group, $R_1$ and $R_2$ are independently substituted or unsubstituted heterocyclic or carbocyclic aromatic groups, and $M^+$ is a monovalent cation.

These compounds have been found not only to have the desired infrared radiation absorption characteristics but also to be soluble in water or water-miscible organic solvents that are often used to formulate and coat lithographic printing plate imaging compositions. In addition, these compounds are compatible with negatively or positively charged polymers that may be present in those compositions (for example, anionic polymers used for imaging such as those described in U.S. Pat. No. 5,985,514, noted above). In other words, no precipitates are formed when such compounds and polymers are mixed.

A preferred use of the compounds of this invention is described in copending and commonly assigned U.S. Ser. No. 09/947,112, filed on even date herewith by Zheng et al. and entitled "Thermal Switchable Composition And Imaging Member Containing Complex Oxonol IR Dye And Methods Of Imaging And Printing".

The compounds can also be used as filter dyes that are compatible with components in color and black-and-white photographic silver halide layers and that do not adversely affect the sensitometric properties of such layers.

DETAILED DESCRIPTION OF THE INVENTION

The compounds of this invention are oxonol infrared radiation sensitive dyes ("IR dyes") that comprise a methine linkage conjugated with a positively charged oxazole group that has a substituted attached to the nitrogen atom. They are soluble in water or any of the water-miscible organic solvents that are commonly useful for preparing heat-sensitive lithographic imaging compositions (for example, methanol, ethanol, isopropanol, 1-methoxy-2-propanol, methyl ethyl ketone, tetrahydrofuran, acetonitrile, butyrolactone and acetone). Preferably, the IR dyes are soluble in either water or methanol, or a mixture of water and methanol. Solubility in water or the water-miscible organic solvents means that the oxonol IR dye can be dissolved at a concentration of at least 0.5 g/l at room temperature.

The oxonol IR dyes are sensitive to radiation in the near-infrared and infrared regions of the electromagnetic spectrum. Thus, they generally have a $\lambda_{max}$ at or above 700 nm (preferably a $\lambda_{max}$ of from about 750 to about 900 nm, and more preferably a $\lambda_{max}$ of from about 800 to about 850 nm).

The oxonol IR dyes can be synthesized using general procedures described by Hamer in *The Cyanine Dyes and Related Compounds*, Interscience Publishers, 1964. A preferred synthetic method is described below.

The oxonol IR dyes of this invention can be represented by Structure DYE shown as follows:

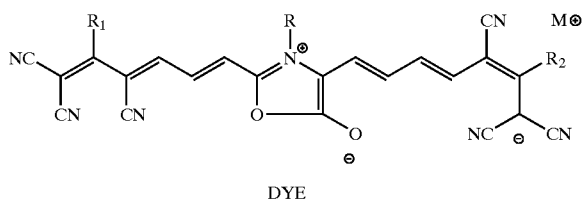

DYE wherein R is a substituted or unsubstituted alkyl group having 1 to 20 carbon atoms (such as methyl, ethyl, isopropyl, t-butyl, hexyl, dodecyl, aminoethyl, methylsulfonaminoethyl, and other groups readily apparent to one skilled in the art), substituted or unsubstituted cycloalkyl groups having 4 to 14 carbon atoms in the ring structure (such as cyclopentyl, cyclohexyl, and others that would be readily apparent to one skilled in the art), substituted or unsubstituted carbocyclic aromatic groups having 6 to 14 carbon atoms in the ring structure (such as phenyl, naphthyl, xylyl, m-carboxyphenyl, and others than would be readily apparent to one skilled in the art), substituted or unsubstituted heterocyclic groups having 3 to 8 carbon, oxygen, nitrogen and sulfur atoms in the ring structure (such as morpholino, pyridyl, pyrimidyl, thiomorpholino, pyrrolidinyl, piperazinyl, and others that would be readily apparent to one skilled in the art). The heterocyclic groups can be aromatic or non-aromatic in nature.

Preferably, R is a substituted or unsubstituted alkyl group having 1 to 10 carbon atoms or a substituted or unsubstituted phenyl group. More preferably, R is a substituted or unsubstituted alkyl group having 1 to 4 carbon atoms (such as substituted or unsubstituted methyl, ethyl, n-propyl, isopropyl, and t-butyl groups) or a substituted or unsubstituted phenyl group. Most preferably, R is an unsubstituted methyl, ethyl, isopropyl, or phenyl group.

$R_1$ and $R_2$ are independently substituted or unsubstituted heterocyclic or carbocyclic aromatic groups having from 5 to 12 atoms in the aromatic ring. Preferably, $R_1$ and $R_2$ represent the same substituted or unsubstituted aromatic group. Useful aromatic groups include, but are not limited to, substituted or unsubstituted phenyl groups, substituted or unsubstituted naphthyl groups and substituted or unsubstituted furyl groups, substituted or unsubstituted thiophenyl groups, and substituted or unsubstituted benzofuryl groups. These aromatic groups can be substituted with one or more amino, methoxy, carboxy, sulfo, sulfonamido or alkylsulfonyl groups. Preferably, when $R_1$ and $R_2$ are substituted, they each have one or more of the same substituents.

Thus, in some embodiments, the compounds are defined wherein R is a substituted or unsubstituted alkyl group or a substituted or unsubstituted phenyl group, and $R_1$ and $R_2$ are the same substituted or unsubstituted heterocyclic or carbocyclic aromatic group. More preferably in these embodiments, $R_1$ and $R_2$ are the same or different phenyl group.

In other embodiments, R is a substituted or unsubstituted alkyl group having 1 to 4 carbon atoms, and $R_1$ and $R_2$ are the same or different substituted or unsubstituted carbocyclic aromatic group. More preferably in these embodiments, R is a substituted or unsubstituted methyl, ethyl, isopropyl, or phenyl group.

$M^+$ is a suitable monovalent cation such as an alkali metal ion (lithium, sodium or potassium), an ammonium ion, a trialkylammonium ion (such as trimethylammonium, triethylammonium or tributylammonium ions), a tetraalkylammonium ion (such as tetramethylammonium ion), pyridinium ion or tetramethyl guanidinium ion.

A preferred class of compounds of this invention are those represented by the Structure DYE shown above wherein R is a substituted or unsubstituted alkyl group or substituted or unsubstituted carbocyclic aryl group, and $R_1$ and $R_2$ are independently substituted or unsubstituted carbocyclic aromatic groups (that is aryl groups).

The dyes of this invention can exist in several tautomeric forms, for example as shown below:

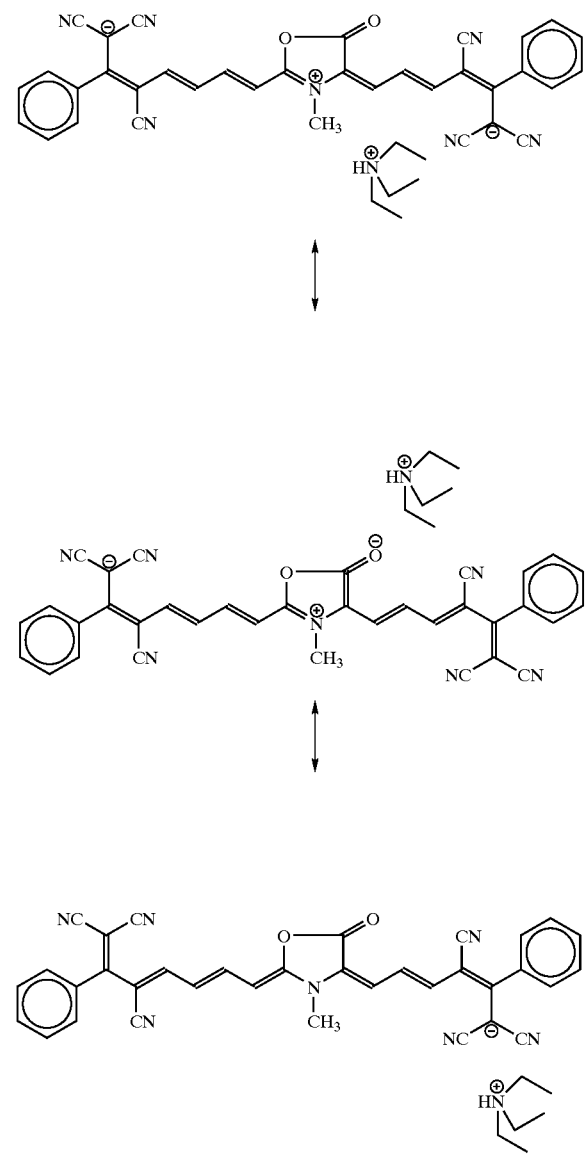

Examples of oxonol IR dyes of this invention include, but are not limited to, the following compounds:

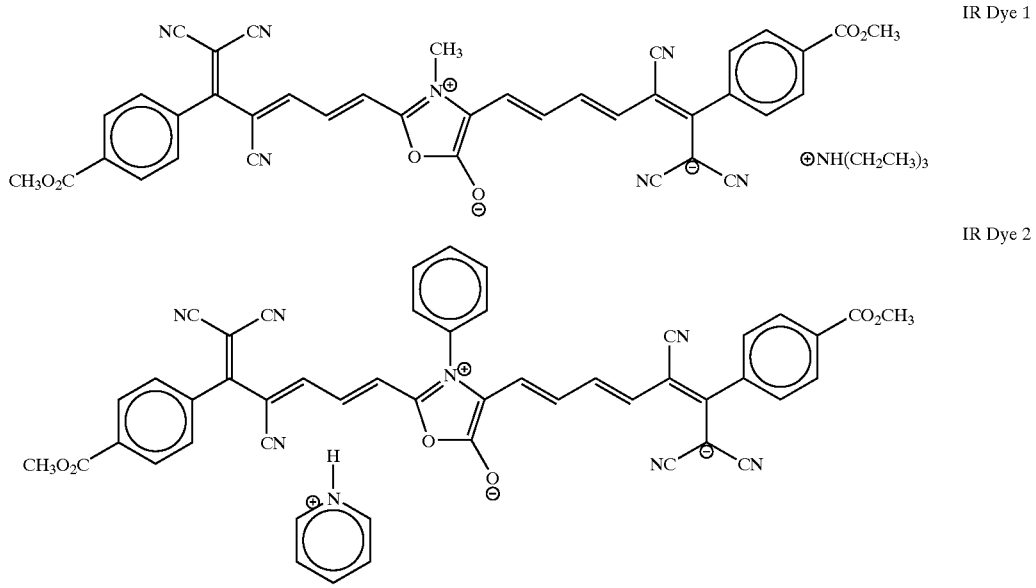

IR Dye 1

IR Dye 2

The most preferred compounds of this invention will depend upon their use. For example, IR Dye 1 is most useful in heat-sensitive printing plates.

The following examples are provided to illustrate the present invention and not to limit it in any way.

Synthetic Example 1

Oxonol IR Dye 1 was prepared using the following synthetic scheme that is generally useful for all of the compounds of this invention.

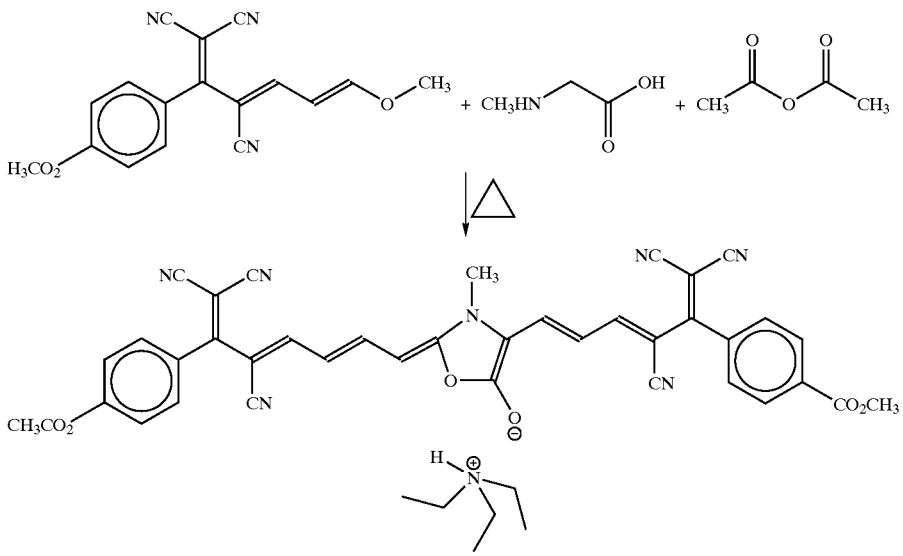

A sample of the noted cyano reagent (6.4 g, 0.02 mole) was heated with 0.5 mole equivalents of sarcosine (commercially available from Aldrich Chemical Co.) in acetic anhydride to boiling. The reaction solution was heated for 5 minutes and triethylamine (5 ml) was added. The solution turned dark blue and after another 5 minutes a green solid precipitated. The solid was collected by filtration and washed 3 times with $CH_3CN$. The solid was dried 16 hours in a vacuum oven at 40° C. The structure was shown to be consistent with IR Dye 1 by NMR and was determined to be >95% pure by HPLC ($\lambda_{max}$ 786 nm ($CH_3OH$), $\lambda_{max}$ 12.4×10$^4$).

IR Dye 2 was similarly prepared and identified except that pyridine was used in place of triethylamine and phenyl-$NHCH_2COOH$ was used in place of sarcosine.

The following example illustrates a preferred utility for the compounds of this invention.

Use Example 1

An imaging formulation was prepared using the components shown as follows:

| Component | Component Amount (parts by weight) |
| --- | --- |
| Heat-sensitive polymer* | 0.33 |
| IR Dye 1 | 0.033 |
| Water | 3.24 |
| Methanol | 0.90 |
| Acetone | 4.50 |

*This polymer was poly(vinyl benzyl thiosulfate sodium salt) as described in U.S. Pat. No. 5,985,514 (Zheng et al.).

The formulation was coated at a dry coating weight of about 1.0 g/m² onto a grained phosphoric acid-anodized aluminum support. The resulting printing plate was air-dried. The imaging layer of the printing plate was imaged at 830 nm on a plate setter like the commercially available CREO TRENDSETTER® (but smaller in size) using doses ranging from 360 to 820 mJ/cm².

The imaged area produced a deep blue image and the undesirable sulfur smell was significantly reduced. The imaged plate was mounted on the plate cylinder of a commercially available full-page printing press (A. B. Dick 9870 duplicator) for press runs. A commercial black ink and Varn Universal Pink fountain solution (from Varn Products Co.) were used. The plate was developed on press within 60 seconds of the press run and printed with full density and high image quality for at least 1,000 impressions.

The invention has been described in detail with particular reference to preferred embodiments thereof, but it will be understood that variations and modifications can be effected within the spirit and scope of the invention.

We claim:

1. A compound that absorbs radiation and has a $\lambda_{max}$ greater than 700 nm as measured in water or a water-miscible organic solvent, and represented by the Structure DYE as follows:

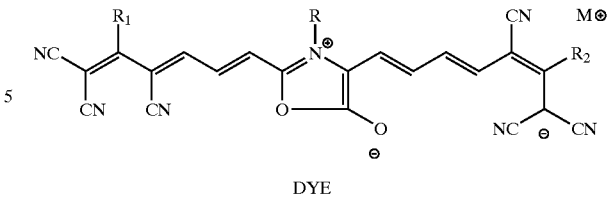

DYE wherein R is a substituted or unsubstituted alkyl group, substituted or unsubstituted cycloalkyl group, substituted or unsubstituted heterocyclic group, or a substituted or unsubstituted carbocyclic aromatic group, $R_1$ and $R_2$ are independently substituted or unsubstituted heterocyclic or carbocyclic aromatic groups, and $M^+$ is a monovalent cation.

2. The compound of claim 1 having a $\lambda_{max}$ of from about 750 to about 900 nm as measured in water or said water-miscible organic solvent.

3. The compound of claim 2 having a $\lambda_{max}$ of from about 800 to about 850 nm as measured in water or said water-miscible organic solvent.

4. The compound of claim 1 wherein R is a substituted or unsubstituted alkyl group or a substituted or unsubstituted phenyl group, and $R_1$ and $R_2$ are the same substituted or unsubstituted heterocyclic or carbocyclic aromatic group.

5. The compound of claim 1 wherein R is a substituted or unsubstituted alkyl group having 1 to 4 carbon atoms, and $R_1$ and $R_2$ are the same or different substituted or unsubstituted carbocyclic aromatic group.

6. The compound of claim 5 wherein R is a substituted or unsubstituted methyl, ethyl, isopropyl, or phenyl group.

7. The compound of claim 1 wherein R is a substituted or unsubstituted alkyl group having 1 to 4 carbon atoms or a substituted or unsubstituted phenyl group, and $R_1$ and $R_2$ are the same substituted or unsubstituted phenyl group.

8. The compound of claim 1 that is one of the following compounds:

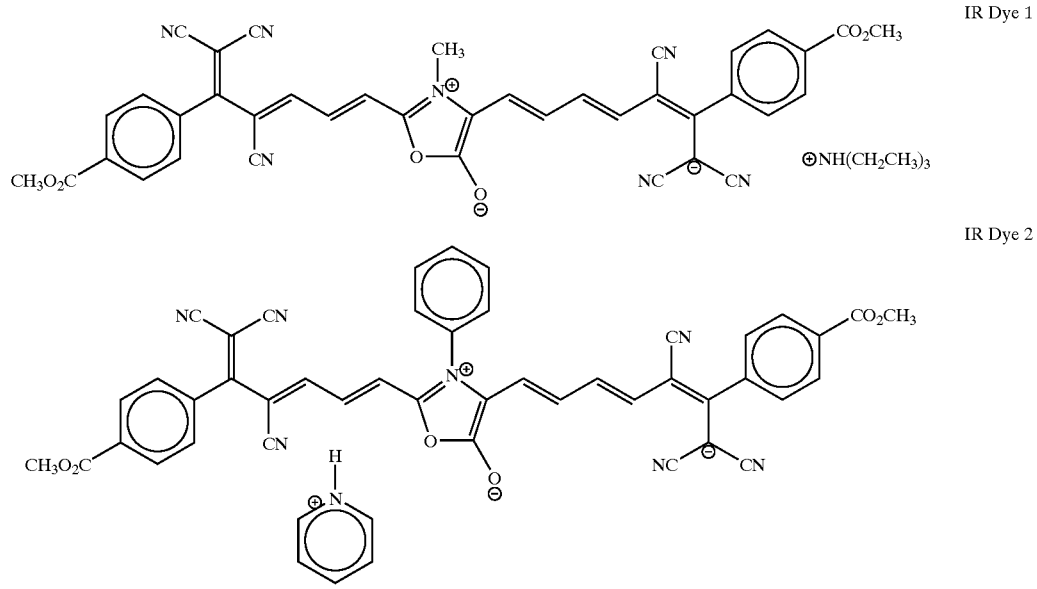

IR Dye 1

IR Dye 2

9. The compound of claim 8 that is IR Dye 1.

* * * * *